United States Patent [19]

Falck et al.

[11] Patent Number: 5,224,577
[45] Date of Patent: Jul. 6, 1993

[54] CALIBRATION METHOD FOR TRANSMISSION CONTROL CLUTCHES

[75] Inventors: Peter L. Falck; Dennis L. Jeffries; David E. Brandon, all of Waterloo, Iowa

[73] Assignee: Deere & Company, Moline, Ill.

[21] Appl. No.: 910,818

[22] Filed: Jul. 9, 1992

[51] Int. Cl.⁵ .................... F16D 21/04; F16H 5/46
[52] U.S. Cl. ..................... 192/0.092; 192/0.033; 192/109 F; 364/424.1
[58] Field of Search ............ 192/0.092, 0.096, 0.032, 192/0.033, 109 F; 364/424.1

[56] References Cited

U.S. PATENT DOCUMENTS

| | | | |
|---|---|---|---|
| 4,741,364 | 5/1988 | Stoss et al. | 137/625.64 |
| 4,855,913 | 8/1989 | Brekkestran et al. | 364/421.1 |
| 4,899,858 | 2/1990 | Coté et al. | 192/0.092 X |
| 4,967,385 | 10/1990 | Brekkestran et al. | 364/571.03 |
| 4,989,471 | 2/1991 | Bulgrien | 74/336 R |
| 5,011,465 | 4/1991 | Jeffries et al. | 475/279 |
| 5,082,097 | 1/1992 | Goeckner et al. | 192/0.032 |
| 5,138,906 | 8/1992 | Iwatsuki et al. | 364/424.1 X |

OTHER PUBLICATIONS

U.S. patent application Ser. No. 07/521,504 (Bulgrien et al.), filed 10 May 1990.
Ford New Holland, "Part 5-Transmission Systems (Post Mar. 1990)", published 1990, pp. 1-7, co-pending with application Ser. No. 07/521,808 filed 10 May 1990.
Goodbar, J. E. and Testerman, M. D., "The Design and Development of a Four Speed Powershift Transmission with Electronic Clutch Pressure Modulation", SAE Technical Paper Series, No. 861212, Sep. 1986.

*Primary Examiner*—Leslie A. Braun
*Assistant Examiner*—Andrea Pitts

[57] ABSTRACT

The hydraulically operated brake and clutch elements (controlled by proportional control valves) of a vehicle powershift transmission have fill pressures which are calibrated by a method wherein the output shaft of the transmission is disconnected from the vehicle drive shaft so that the transmission output shaft is free to rotate and certain ones of the plurality of the control elements other than the control element being calibrated are fully pressurized in order to prevent rotation of a part of the control element being calibrated. The engine is run at a predetermined speed and the pressure applied to the control element being calibrated is gradually increased while engine speed is monitored. When the monitored engine speed changes by predetermined amount, a value is saved corresponding to the calibration pressure. The transmission is automatically shifted to neutral if vehicle motion is sensed. The volume of hydraulic fluid required to initially engage the control element may be calibrated in a similar manner.

12 Claims, 12 Drawing Sheets

CALIBRATION METHOD FOR TRANSMISSION CONTROL CLUTCHES

BACKGROUND OF THE INVENTION

This invention relates to a vehicle transmission control system, in particular a microprocessor-based electronic control system for a powershift transmission having solenoid valve operated transmission control elements, such as brakes and clutches, and more particularly to a calibrating method which is a method of determining key parameters relating to the operation and control of the brake or clutch elements.

Some manufacturers have used versions of electrohydraulic transmission controls with some success. Some such control systems have utilized proportionally controlled valves, but most such systems have used mostly simple on-off valves, with just one or two transmission control clutches controlled by proportional valves. For example, a powershift transmission sold by Ford New Holland, Ltd. has two modulating valves which control three different transmission control clutches. These valves are in turn controlled by an electronic controller. Such a proportional control allows a clutch element to be modulated during engagement and release of that element, and the controller provides the ability to vary the modulation for a particular element for each unique shift. Another system which includes on-off valves and at least one proportional control valve is described in U.S. Pat. No. 4,855,913, issued Aug. 8, 1989 to Brekkestran et al.

In such systems with proportional control valves it is possible and desirable to accurately control the torque capacities of the clutches during engagement. While the electrical command supplied to the control valve may be very precise, manufacturing tolerances in the valves and transmission cause large variations on an actual vehicle. If it is known what electrical command corresponds to the initial clutch engagement pressure which causes a clutch to just begin carrying torque, then this command could be used to modify the shift command for that clutch during shifting to provide optimized control.

It is also useful to determine the clutch fill time, which corresponds to volume of oil required to fill and engage a transmission control clutch. This is because manufacturing tolerances may cause variations from one transmission to the next. Also, the clutch fill time will change as a result of normal component wear as the transmission ages. If this variation can be measured, then the shift commands can be modified to compensate for such variations.

For example, the Brekkestran reference discloses that the key parameters in the control system include the initial clutch engagement pressure (represented by DC-MAX) and the fast-fill clutch delay (represented by T1). The Brekkestran reference further states that DC-MAX and T1 must be determined by laboratory or field tests. However, the Brekkestran reference does not disclose any method for determining these values.

A calibrating method or a method of determining the pressure necessary to achieve clutch engagement in a microprocessor-based transmission control system is described in U.S. Pat. No. 4,989,471, issued on Feb. 5, 1991 to Bulgrien. The Bulgrien method includes braking the transmission output shaft, then gradually increasing the clutch pressure and saving a value corresponding to the clutch pressure at which the engine speed begins to decrease. However, this method requires use of the vehicle brakes to prevent rotation of the transmission output shaft. Such a procedure could be dangerous if the vehicle brakes are not applied or if the brakes fail, because then undesired vehicle motion could result during calibration. The Bulgrien patent also illustrates an alternate method of calibrating a clutch by sensing when the clutch transmits sufficient torque to move the vehicle. This alternate method requires that the vehicle be placed in a position where vehicle motion is not a safety concern, and the results of such a method will vary depending upon the terrain on which the vehicle is placed. The Bulgrien reference does not disclose any method for determining a clutch fill time value.

U.S. Pat. No. 5,082,097, issued on Jan. 21, 1992 to Goeckner et al. relates to a transmission controller for a transmission which includes a solenoid valve operated clutch and a solenoid valve for operating the clutch. The Goeckner et al. system also discloses a calibrating system or a system for determining a current signal corresponding to the point at which the clutch begins to transmit torque. This system includes a vehicle monitor for producing a threshold signal when the clutch begins to carry a predetermined amount of torque and a memory for storing a calibration value corresponding to the value of the current at which the clutch carries the predetermined amount of torque. However, this system requires a controller which generates a controlled current signal and a current monitoring circuit which generates a signal which corresponds to the current flow to the solenoid valve. Furthermore, the threshold signal in this system is either vehicle movement or engine droop, and the calibration procedure does not appear to involve disconnecting an output shaft of the transmission from a vehicle drive shaft. As a result, the calibration procedure described in Goeckner et al. would appear to be similar to the methods described in the Bulgrien patent, and would appear to have to involve allowing vehicle movement during calibration, or applying the vehicle brakes during calibration.

SUMMARY OF THE INVENTION

An object of the present invention is to provide a method of determining key parameters for the control of proportional control valves for a powershift transmission.

Another object of the invention is to provide a such method which can be used at the time the powershift transmission is first built or installed in the vehicle and which can be used as the powershift transmission ages or is repaired.

Another object of the invention is to provide such a method which can be used without application of the vehicle brakes and without requiring that the vehicle move during operation of the method.

These and other objects are achieved by the present invention wherein a control system for a vehicle powershift transmission is calibrated. First, the transmission output shaft is disconnected from the drive wheels and the engine is run at a predetermined speed. Depending upon which transmission control element is to be calibrated, certain ones of the plurality of the control clutches, other than the control clutch being calibrated, are engaged in order to prevent rotation of a part of the control clutch being calibrated. Then the duty cycle of a pulse-width-modulated voltage signal applied to the proportional control valve is gradually modified to increase the pressure applied to the control clutch being calibrated while the engine speed is monitored. When the monitored engine speed droops by a predetermined amount, a value corresponding to the pressure applied to the proportional control valve is stored as the clutch calibration pressure value. In order to determine the fill volume of an element, the element is fully pressurized while the engine speed is monitored. The time required for this pressurization to cause a decrease in engine speed will represent the volume of fluid required to fill the element so that it begins to carry torque.

BRIEF DESCRIPTION OF THE DRAWINGS

FIG. 2b illustrates in greater detail a portion of the transmission of FIG. 2a.

DETAILED DESCRIPTION

Figure 1:
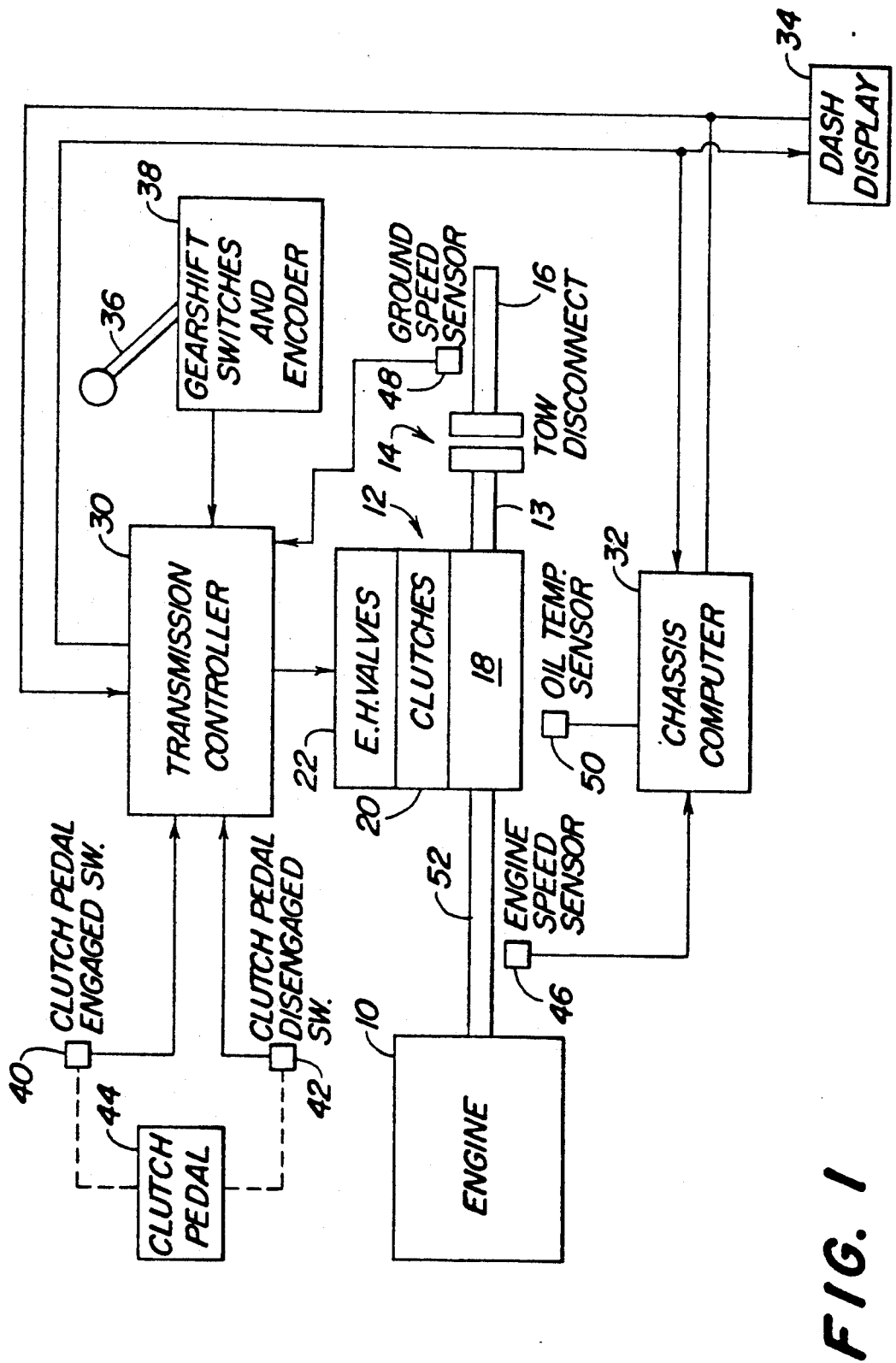
FIG. 1 is a schematic block diagram of a microprocessor-based transmission control system to which the present invention is applicable.

As shown in FIG. 1, a vehicle power train includes an engine 10 which drives a power shift transmission 12. which has an output shaft 13, which, via a conventional tow disconnect mechanism 14, drives an output drive shaft 16 which is connected to drive wheels (not shown). The power shift transmission 12 includes a transmission 18 which is operated by a set of pressure operated control elements or clutches 20 which are controlled by a corresponding set of solenoid operated proportional control valves 22. The transmission 18 may be a transmission such as described in U.S. Pat. No. 5,011,465, issued Apr. 30 1991 to Jeffries et al , and assigned to the assignee of this application. The valves 22 may be two-stage electrohydraulic valves as described in U.S. Pat. No. 4,741,364, issued May 3, 1988 to Stoss et al. and assigned to applicant's assignee.

The power shift transmission control system includes a transmission control unit 30, a chassis computer 32 and a dash display 34. The transmission control unit 30 and the chassis computer 32 are preferably microprocessor-based electronic control units Manual control is achieved via a gearshift lever 36. A gearshift switches and encoder unit 38 provides signals representing the position of the lever 36 to the transmission control unit 30. A clutch engagement switch 40 and a clutch disengagement switch 42 provide signals representing the position of a clutch pedal 44. The transmission control unit 30 also receives signals from a ground speed sensor 48. The chassis computer 32 also receives signals from an engine speed sensor 46 and a transmission oil temperature sensor 50. The chassis computer sends information from these sensors to the transmission control unit 30.

The transmission control unit 30 includes a commercially available microprocessor (not shown) which, in response to an operator generated signal, executes a computer program which implements operation of the calibration methods described hereinafter. The transmission control unit 30 also includes valve drivers (not shown) which provide variable duty cycle pulse-width-modulated voltage control signals to the valves 22. The transmission control unit 30 and the valve drivers (not shown) will generate such control signals as a function of various sensed and operator determined inputs in order to achieve a desired pressure in the clutches and to thereby control the shifting of the transmission 12 in a desired manner. However, the present invention is not concerned with the control of the shifting of the transmission 12, the transmission 12 itself, or the valves 22, since the present invention is concerned only with the calibration of certain parameters. The method of the present invention is implemented by the control unit 30 which executes the computer program which is listed in the microfiche appendix. The computer program listing is in (Motorola 68HC11) assembly language.

Figure 2A:
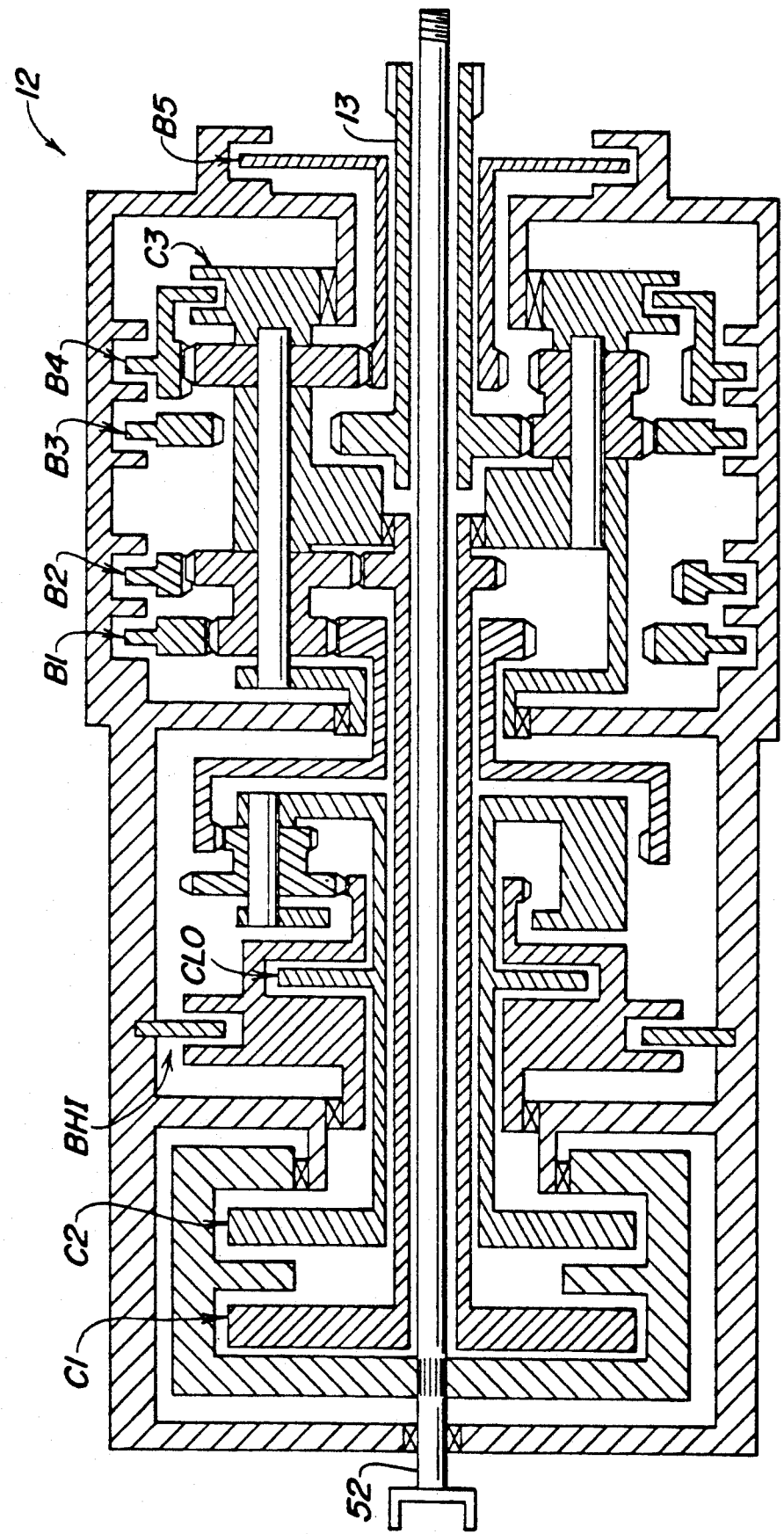
FIG. 2a is a schematic representation or a transmission to which the present invention is applicable.
Figure 2B:
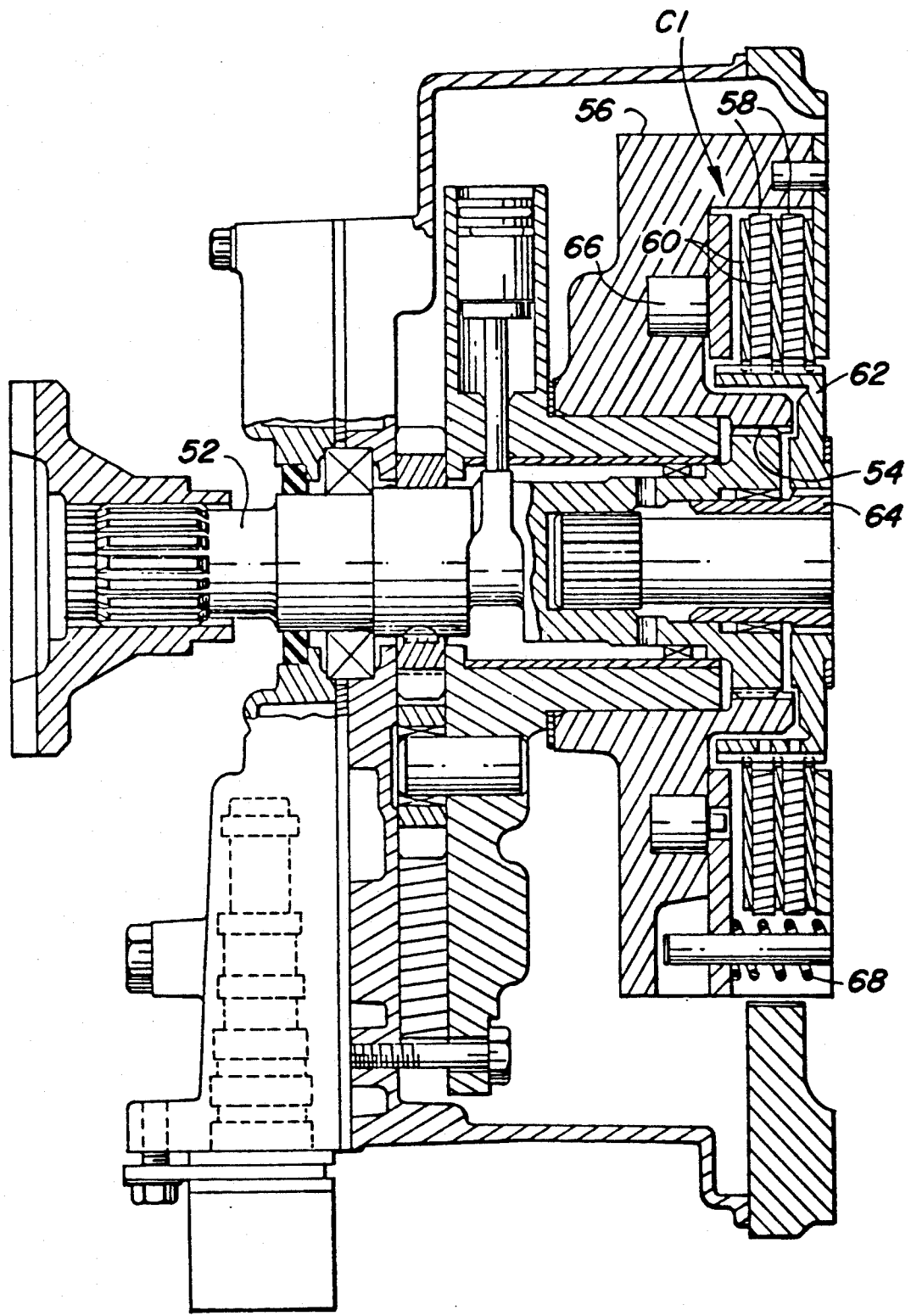

Referring to FIG. 2a and 2b, the control elements of transmission 12 include a set of brake elements B1, B2, B3, B4 and B5, and a set of clutch elements C1, C2, C3, and CLO. The input shaft 52 is connected by splines 54 to the clutch drum 56 of clutch C1 and of clutch C2 (not shown in FIG. 2b). The drum 56 in turn is splined to the clutch separators 58 of clutch C1. The clutch disks 60 of clutch C1 are splined to the clutch hub 62 of clutch Cl. The clutch hub 62 is splined to a first intermediate shaft 64. The first clutch C1 is provided with a piston 66 for activating the clutch C1 by compressing the clutch separators and disks 58, 60. A spring 68 is provided to bias clutch C1 out of engagement. For further information regarding the details of such a transmission reference is made to U.S. Pat. No. 5,011,465, which is incorporated by reference herein.

The clutch piston 66, as well as the pressure operated elements of the other clutches and brakes, are each provided with hydraulic fluid from a pump (not shown) under the control of a corresponding one of the valves 22, in the usual fashion which is well-known to one of ordinary skill in the art, and therefore will not be described further herein.

Calibration Method

The following calibration method will determine the valve pressure command signal Pfill(el) required to just engage each clutch or brake element, and it will determine the fill volume times twake(el) required to nearly fill the corresponding clutch and brake elements Before the automatic calibration procedure of the control unit 30 is enabled, the operator should disengage the tow disconnect device 14 so that the transmission output shaft 13 is free to rotate, the shift lever 36 must be in neutral, the oil temperature must be above a threshold, and the engine speed must be set to a certain level (within a range).

Figure 3:
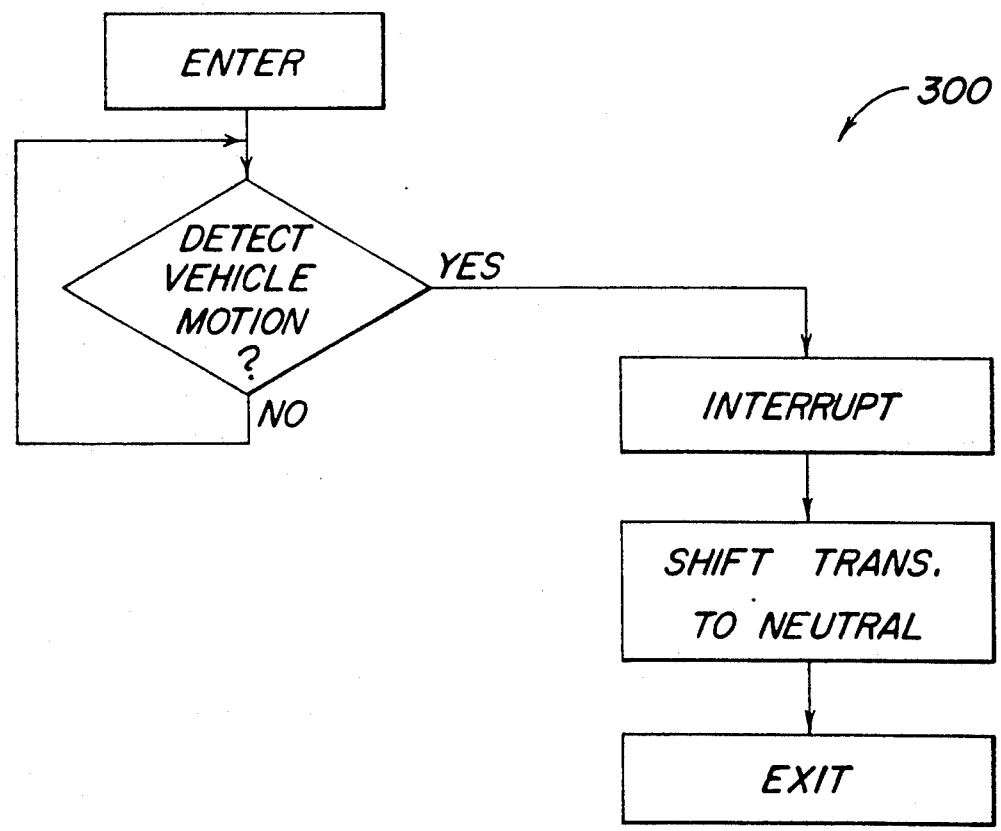
FIG. 3 is a simplified logic flow diagram of a motion detection interrupt algorithm which is performed by the method of the present invention.

Referring to FIG. 3, the control unit 30 continuously performs a motion detection interrupt algorithm 300 which is in the background while other functions are being performed. This algorithm 300 monitors the signal from speed sensor 48 to detect motion of the vehicle. If vehicle motion is detected, any other functions are interrupted and the transmission 18 is automatically shifted to neutral to prevent further vehicle motion.

Main Calibration Loop

Figure 4A:
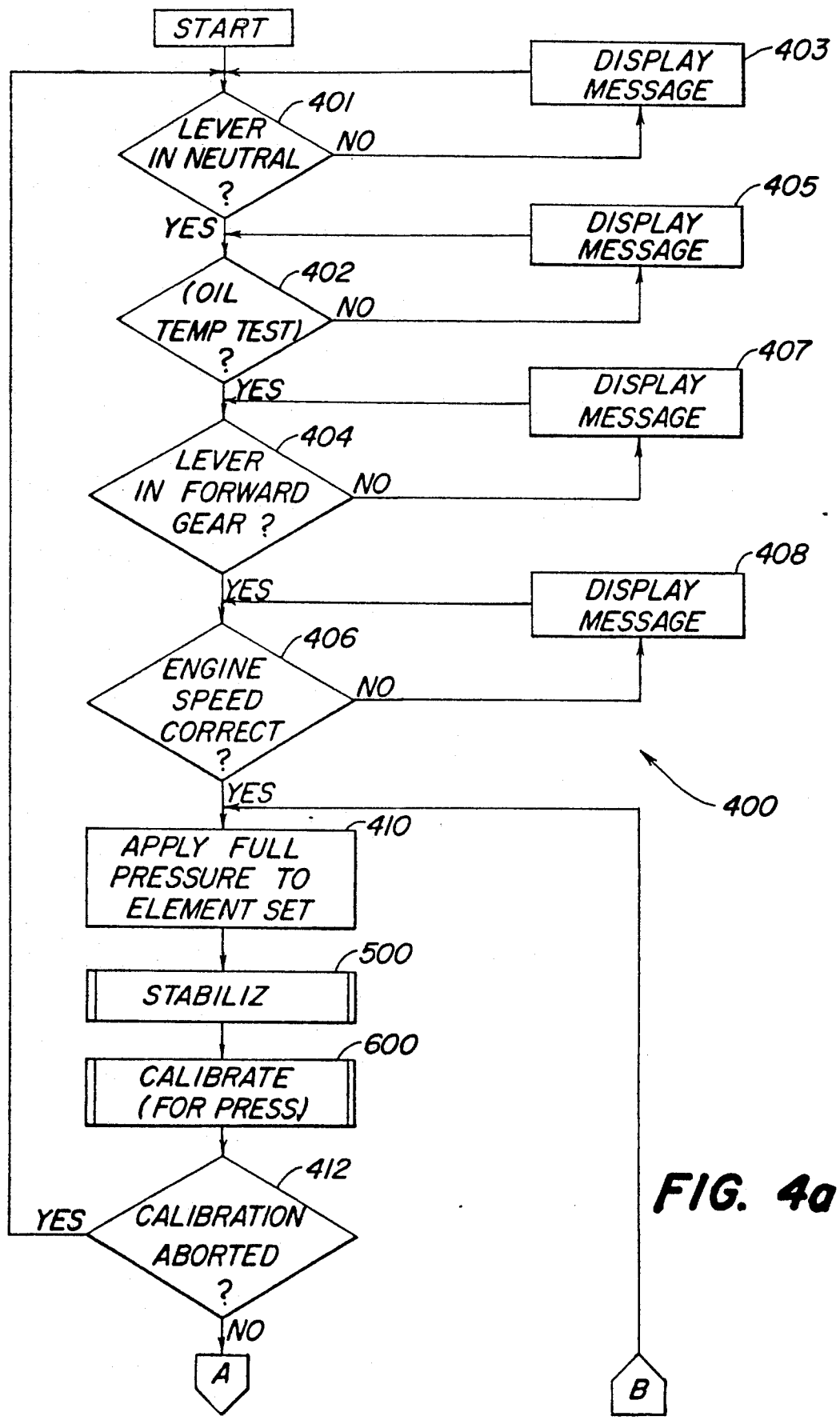
FIGS. 4a and 4b are simplified logic flow diagrams of a main loop algorithm which is performed by the method of the present invention.
Figure 4B:
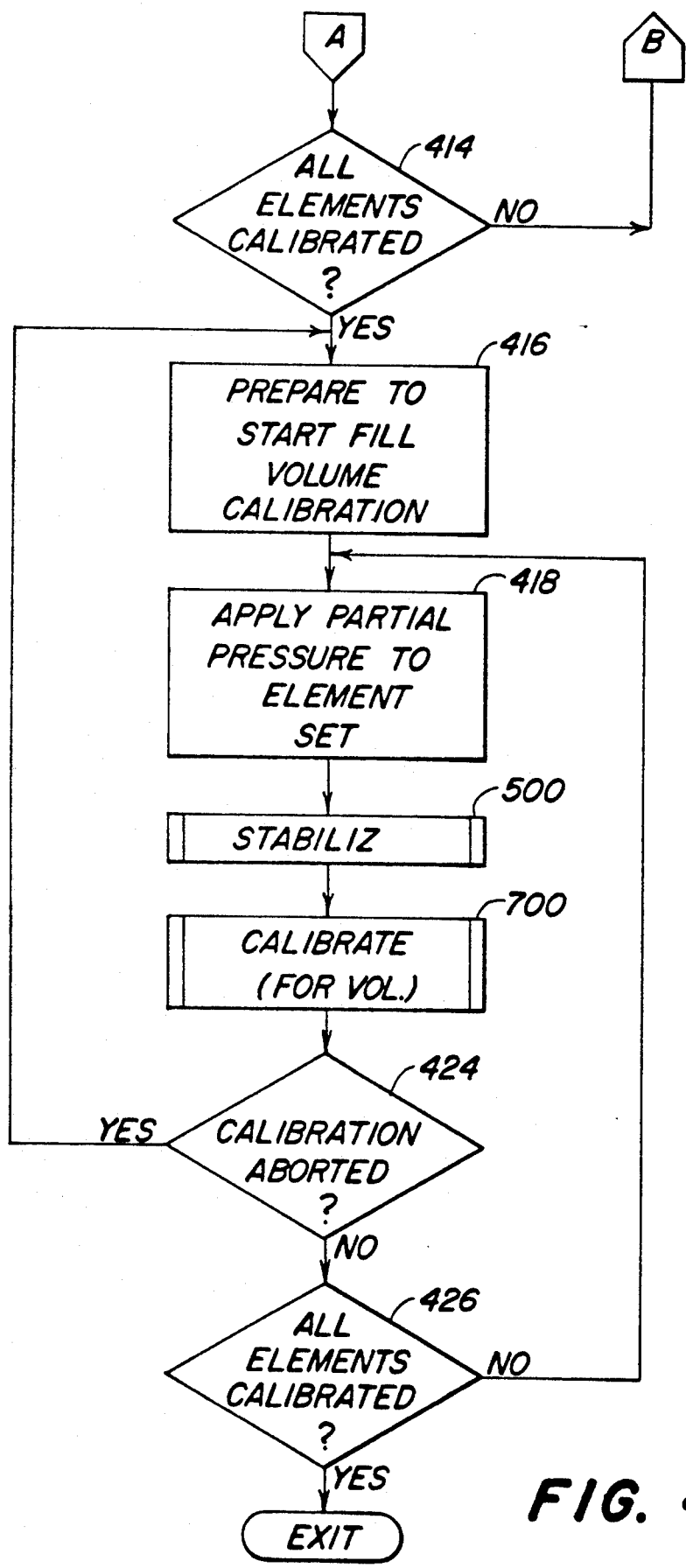

In the main calibration loop 400 (FIGS. 4a and 4b) the control unit 30 performs the following calibration procedure. First, step 401 checks to make sure the shift lever 36 is in neutral before starting the calibration procedure. If the shift lever 36 is not in neutral, step 403 displays a message or symbol on the display 34 until the shift lever 36 is in neutral. If the shift lever 36 is in neutral, the calibration procedure continues to step 402. This is important because it prevents unexpected motion if the operator if the calibration procedure is activated by mistake with the shift lever in gear. Without this step, if the oil is warm and the lever 36 is in Forward and the engine speed is 2100 rpm, first gear will be engaged every time calibration procedure is selected.

Step 402 monitors the oil temperature signal from sensor 50 and, if the oil temperature is less than Tcal, step 405 displays a message or symbol on the display 34 until the oil temperature is greater than or equal to Tcal. If the oil temperature is greater than or equal to a threshold temperature "TcalOil", the calibration procedure continues to step 404.

Step 404 checks if the shift lever 36 is placed in a forward gear position by monitoring the condition of "Forward" and "Not Neutral" lever position switches (not shown), and if not, then step 407 a message or symbol on the display 34 to prompt the operator to place the shift lever 36 in a forward position until lever 36 is placed in a forward position.

Next, step 406 monitors the engine speed signal from sensor 46 and, if the engine speed is outside of the desired range, step 408 displays a message or symbol on the display 34 until the engine speed is within the desired range. If the engine speed is within the desired range, the calibration procedure continues to step 410.

For each element to be calibrated, step 410 applies full pressure to a certain set of the clutch and/or brake elements in order to create an internal fight between the different parts of the element to be calibrated when that element is pressurized, in other words, to cause relative rotation between the different parts of the element to be calibrated. For example, with respect to clutch C1 and referring to FIG. 2b, the clutch drum 56 will be rotating with the input shaft 52. When brakes B1 and B2 are pressurized, this prevents rotation of hub 62 so that there is relative rotation between parts 56 and 62 of clutch C1.

The following table sets forth one possible order in which the elements are to be calibrated, and for each element being calibrated, the set of the other elements which are fully pressurized to create the appropriate internal fight, it being understood that other orders are possible and that other combinations of elements can be pressurized to create the desired internal fight. This table applies to the particular transmission described in U.S. Pat. No. 5,011,465. However, one skilled in the art would be able to determine similar combinations of elements for other powershift transmissions.

| Calibration Table | |
|---|---|
| Element to be Calibrated | Elements to be Fully Pressurized |
| Tow Test | C1, B1 and C3 |
| C2 | B1, B2 |
| B2 | C1, C2, CLO, B5 |
| C3 | C2, B2, B3 |
| B3 | C1, C2, CLO, B5 |
| C1 | B1, B2 |
| B1 | C1, C2, CLO, B5 |
| B5 | C2, B2, B3 |
| B4 | C2, B2, B3 |

Figure 5:
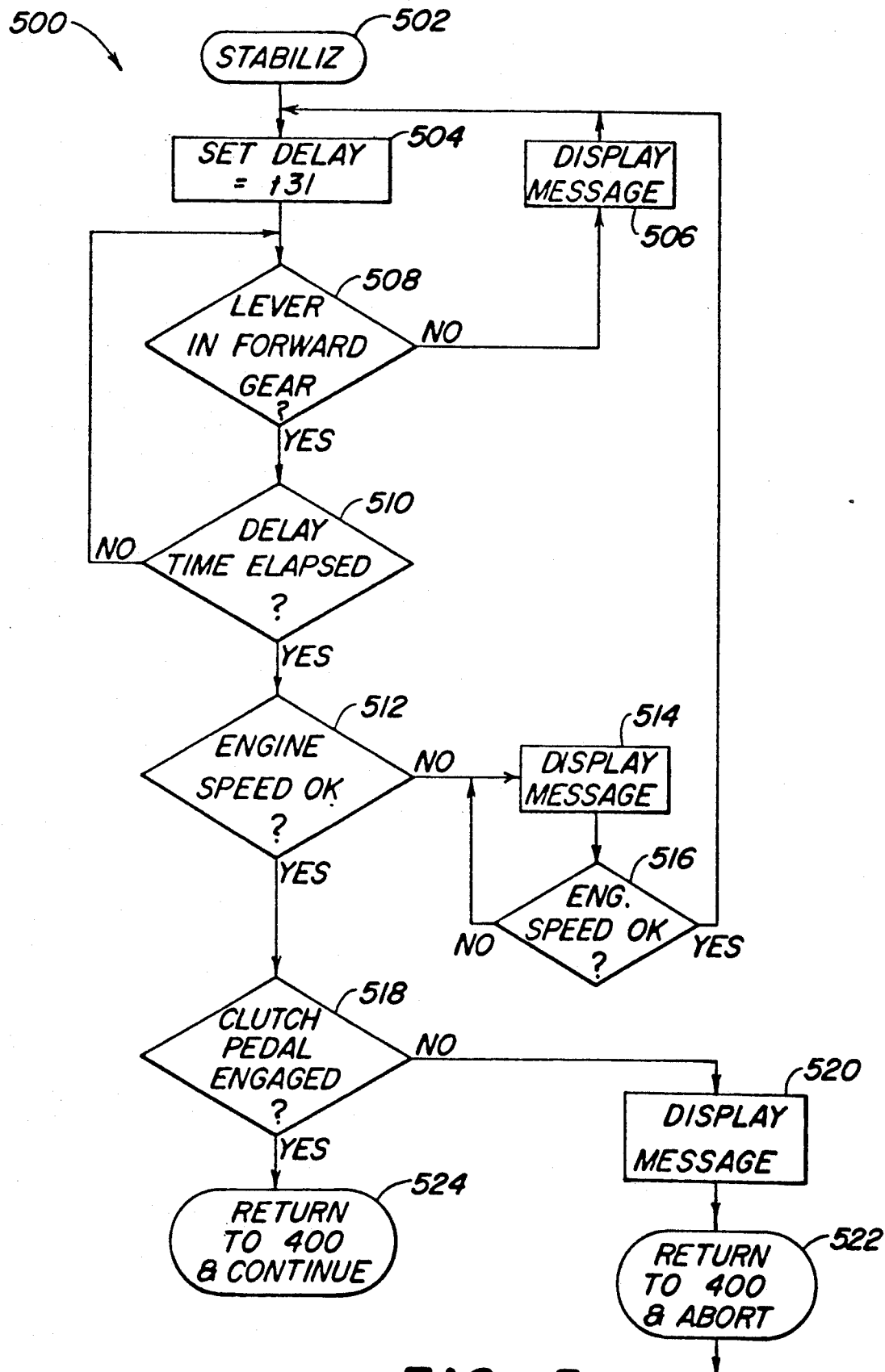
FIG. 5 is a simplified logic flow diagram of a stabilization algorithm which is performed by the main loop algorithm of the present invention.

Next, step 500 calls a "Stabiliz" subprocedure shown in FIG. 5. This subprocedure (steps 504-520) pauses for a length of time sufficient for the hydraulic system and the engine to stabilize before proceeding. A check is made (step 508) to determine that the lever 36 remains in the forward position. If not, an error message is displayed (step 506) until the lever 36 is placed in a forward position.

After the prescribed time has elapsed, the engine speed is checked (step 512) to make sure it is within tolerance for the procedure. If not, a message is displayed (step 514) to indicate that the calibration method is waiting for the system to stabilize. If the engine speed becomes correct (step 516), control returns to the beginning of this "Stabiliz" subprocedure (step 504). When step 512 determines that the engine speed is within the proper speed range then step 518 checks to see if the clutch pedal is engaged. If not, a message is displayed by step 520, the algorithm returns to the main loop 400 and the calibration procedure is aborted without executing the Calibrate subprocedure 600. If the clutch pedal is engaged, then step 518 causes a return to step 600 of the main loop 400. It should be noted that if the clutch is not engaged when tested in step 518, the algorithm not only returns to the main loop 400, but the algorithm also does not execute step 600 (or 700) before aborting.

Fill Pressure Calibration

The "Press. Cal" subprocedure 600 for fill pressure calibration is performed to determine the calibration pressure "Pfill(el)" value for each transmission control element. If an element cannot be calibrated for any reason, the previously stored Pfill(el) for that element shall not be altered. Also, if Pfill(el) is determined for an element during the calibration and then the calibration procedure crashes later for some other element, the elements which were calibrated correctly shall retain their correct values for Pfill(el).

Figure 6A:
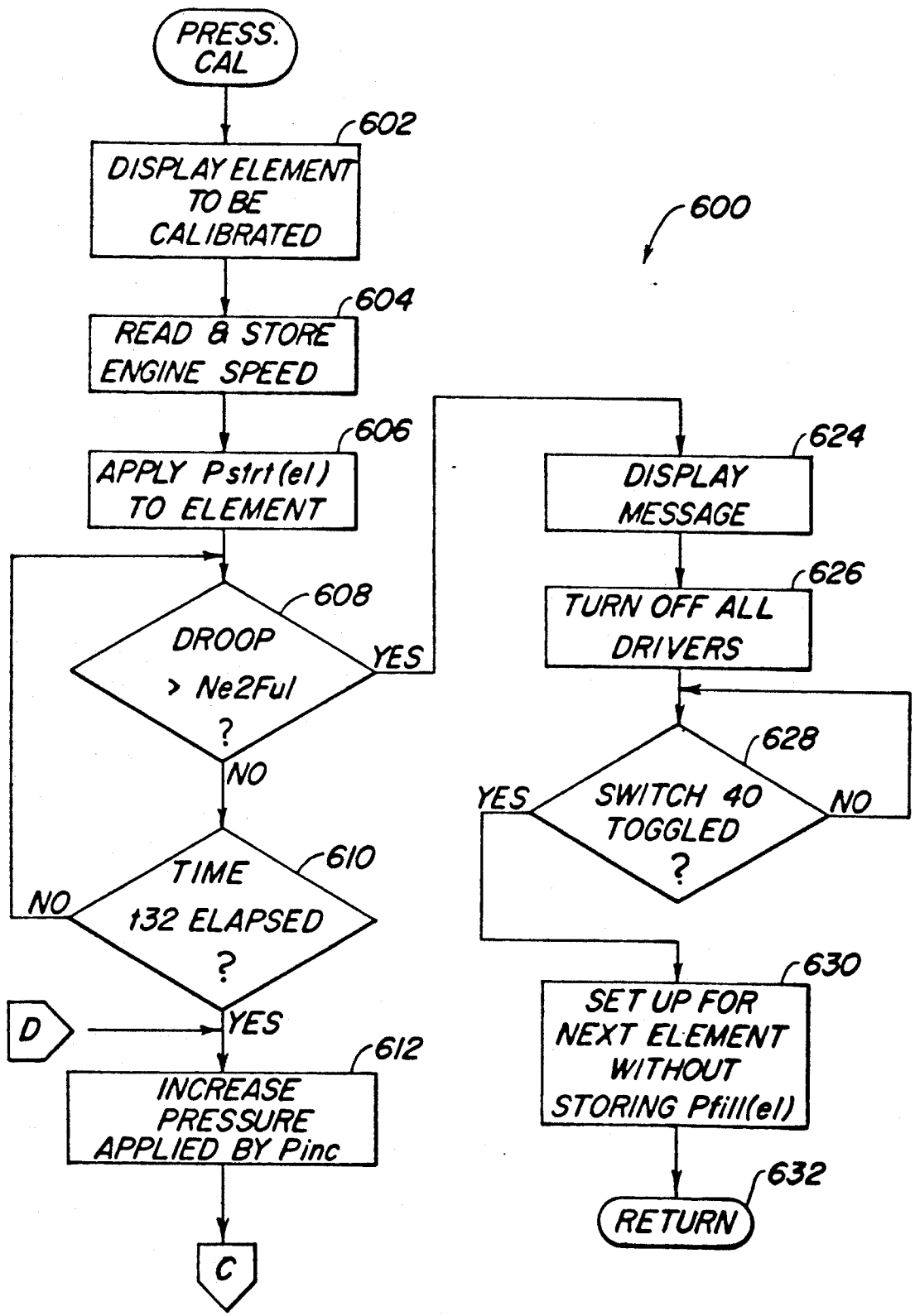
FIGS. 6a and 6b form a simplified logic flow diagram of a pressure calibration algorithm which is performed by the main loop algorithm of the present invention FIGS. 7a and 7b form a simplified logic flow diagram of a volume calibration algorithm which is performed by the main loop algorithm of the present invention.
Figure 6B:
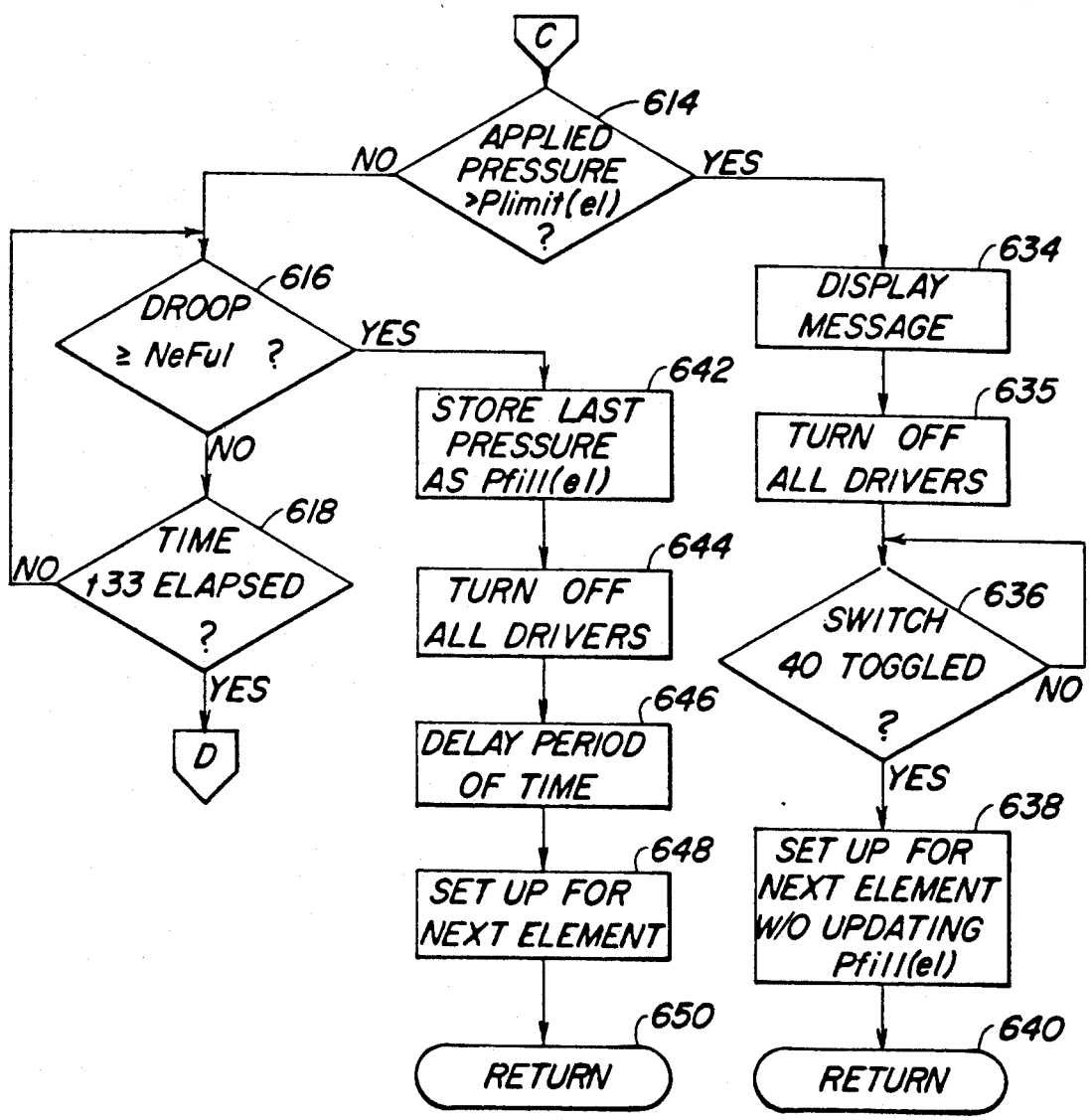

Referring now to FIGS. 6a-6b, step 602 of this subprocedure displays a message or symbol to indicate which element is being calibrated. As shown in the preceding table, at the beginning of the automatic calibration procedure elements C1, B1 and C3 are automatically fully pressurized (engaging gear 1F). If the tow disconnect device 14 is engaged this will cause the motion detect algorithm 300 to detect vehicle motion, whereupon the calibration method is interrupted and the transmission 12 is automatically shifted to neutral. This operates as a check on whether or not the tow disconnect device 14 is disengaged.

If the tow disconnect device 14 is disengaged, no motion will be detected whereupon the system exits procedure 600, returns to the main calibration loop at step 410 and automatically determines the pressure command required to just engage each clutch or brake by continued execution of the main calibration loop. In step 604 the engine speed from sensor 46 is read and stored. Next, for the element being calibrated, a low starting pressure Pstrt(el) which corresponds to that element is commanded by step 606. If the element is C1 or C2, this Pstrt(el) is modified or reduced by an amount which depends upon the engine speed in order to compensate for centrifugal head which is the pressure created by the spinning of the element itself (compensating for pressure generated centrifugally in a rotating hydraulic cylinder is known from U.S. Pat. No. 4,718,306, issued Jan. 12, 1988 to Shigematsu et al.). These adjustment pressures are illustrated in the following table and are stored in a "lookup" table in the memory of the control unit 30. Table locations are in increments of 128 revolutions per minute beginning with the first table location. For engine speeds above 2176 revolutions per minute, the controller shall use 0 kPa as the compensation value.

| Centrifugal Head Compensation Table | |
|---|---|
| Engine Speed (r/min) | Compensation Value (kPa) |
| 640 | 133 |
| 768 | 127 |
| 896 | 120 |
| 1024 | 113 |
| 1152 | 107 |
| 1280 | 100 |
| 1408 | 93 |
| 1536 | 80 |
| 1664 | 67 |
| 1792 | 60 |
| 1920 | 47 |
| 2048 | 33 |
| 2176 | 13 |

This starting pressure is held while steps 608 and 610 operate to compare the droop to a threshold value NeFull for a time 532. If the engine droop speed (or engine speed reduction) does not exceed the threshold NeFull, then control passes to the step 612. If the droop does exceed the threshold, then steps 624–632 operate to display a certain character and turn off or depressurize all elements. Step 628 prevents further operation until switch 40 is toggled (off then on). Then, once switch 40 has detected that the clutch pedal 44 is depressed and released, step 630 causes the controller to leave the current element without storing a Pfill(el) value and to set up for calibrating the next element.

Next, in step 612 the pressure command applied to the element being calibrated is increased by an increment "Pinc". If in step 614 the new pressure command is greater than Plimit(el) for the corresponding element, then in steps 634–640 a certain character is displayed (step 634) and all elements are turned off (step 635). Step 636 prevents further operation until Clutch Engaged switch 40 is toggled, then step 638 causes the controller to leave the current element without storing a fill pressure and set up to calibrate the next element. If in step 614 the new pressure does not exceed Plimit(el), then control proceeds to step 616.

Then, in step 616 the engine droop is again calculated and compared to the threshold NeFull and the increased pressure command is held for time t33 by step 618.

If the droop is greater than or equal to NeFull, then the element is considered to be "full" and the currently commanded pressure (minus any centrifugal head compensation pressure, if applicable) is the fill pressure Pfill(el). This Pfill(el) value is stored in step 642 and the drivers for all elements are turned off by step 644. Then step 646 delays for a period of time, step 648 sets up for the next element and step 650 causes a return to the main loop.

If in step 616 the droop is less than NeFull, then control is returned to step 612 and the algorithm continues in this manner until the droop has reached threshold NeFull in step 616 or until the pressure command has exceeded a predetermined limit for that element (Plimit(el)) in step 614, whereupon control is returned to step 412 of the main loop.

Returning now to FIGS. 4a and 4b, step 412 returns the algorithm to s 402 if either of the stabilization or the calibration procedures is aborted because the lever 36 was in neutral or because the clutch pedal 44 was depressed. Steps 410, 500 600 and 412 are repeated until step 414 determines that the last element has been calibrated, whereupon the algorithm proceeds to step 416 which prepares for start of fill volume calibration, then to step 418 which applies partial pressure to the element set for the element to be calibrated. Then the Stabiliz subroutine 500 is executed and then a fill volume calibration procedure 700 is performed. Step 424 returns the algorithm to step 416 if the calibration procedure is aborted, otherwise the algorithm proceeds to step 426. Steps 418, 500, 700 and 424 are repeated until step 426 determines that the last element has been calibrated, whereupon the algorithm is exited.

The values determined by this calibration procedure are also preferably adjusted to compensate for variations in oil temperature, battery voltage, etc.

With this system and method, all transmission brake and/or clutch elements may be calibrated in turn without any further input from the operator. This virtually eliminates any chance of operator induced error (such as not calibrating one or more elements) in the procedure.

Because the tow disconnect device 14 is disengaged and internal fights between transmission elements are used to determine when engagement occurs, the output shaft 13 is not restrained from rotation and no vehicle motion can occur. Therefore, with this calibration method it is not necessary to rely on the vehicle brakes to prevent dangerous vehicle movement. As an additional safety feature, this calibration routine also continually checks for vehicle motion (by monitoring the output of ground speed sensor 48), and stops the process and places the transmission 18 in neutral (all valves 22 off) if motion is sensed. In particular, a forward gear of the transmission is engaged during the initial stages of the calibration method so that if the tow disconnect device 14 is not disengaged, the vehicle will move only a very short distance before the transmission 18 is automatically shifted to neutral.

It should be noted that, during steps 600 and 700, the controller continually monitors the clutch pedal 44 to make sure it remains fully engaged during calibration. If during calibration the clutch pedal 44 is not engaged", the controller exits the routine and aborts the calibration procedure as shown in steps 412 and 424.

Figure 4C:
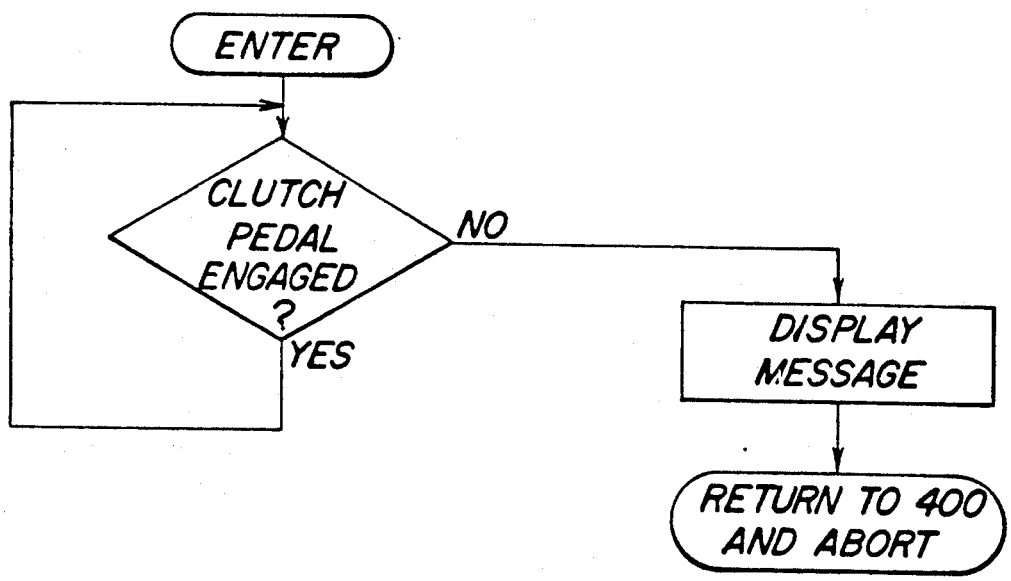
FIG. 4c is simplified logic flow diagram of a clutch engagement checking algorithm which is performed by the method of the present invention.

It should be noted that in subprocedure 600, this clutch pedal check is active until execution reaches step 624 or 634. After that, the clutch pedal is required for acknowledging the fault so that operation can continue to the next element to be calibrated. In subprocedure 700, the clutch pedal 44 is similarly checked until step 718 or 732, and may even be checked until step 752. In other words, the check is required during the actual calibration of the element. This checking procedure is illustrated by the flow chart of FIG. 4c.

Fill Volume Calibration

The "Vol. Cal." subprocedure 700 for fill volume calibration is performed to determine the fill volume calibration value for each transmission control element. The fill volume calibration method is similar to the fill pressure calibration method. Each element will be calibrated individually, and preferably in the same order as in the fill pressure calibration method. As before, the tow disconnect device 14 must be disengaged to prevent unexpected motion, and any vehicle movement during the calibration cycle will cause the transmission 18 to be automatically placed in neutral. This calibration cycle is automatically entered upon completion of the fill pressure calibration procedure. Again, the cycle proceeds without the need for any operator input.

Each individual element is fill volume calibrated by engaging the same combination of elements for the element being calibrated as used in fill pressure calibration method. However, all of these elements will only be partially pressurized.

Figure 7A:
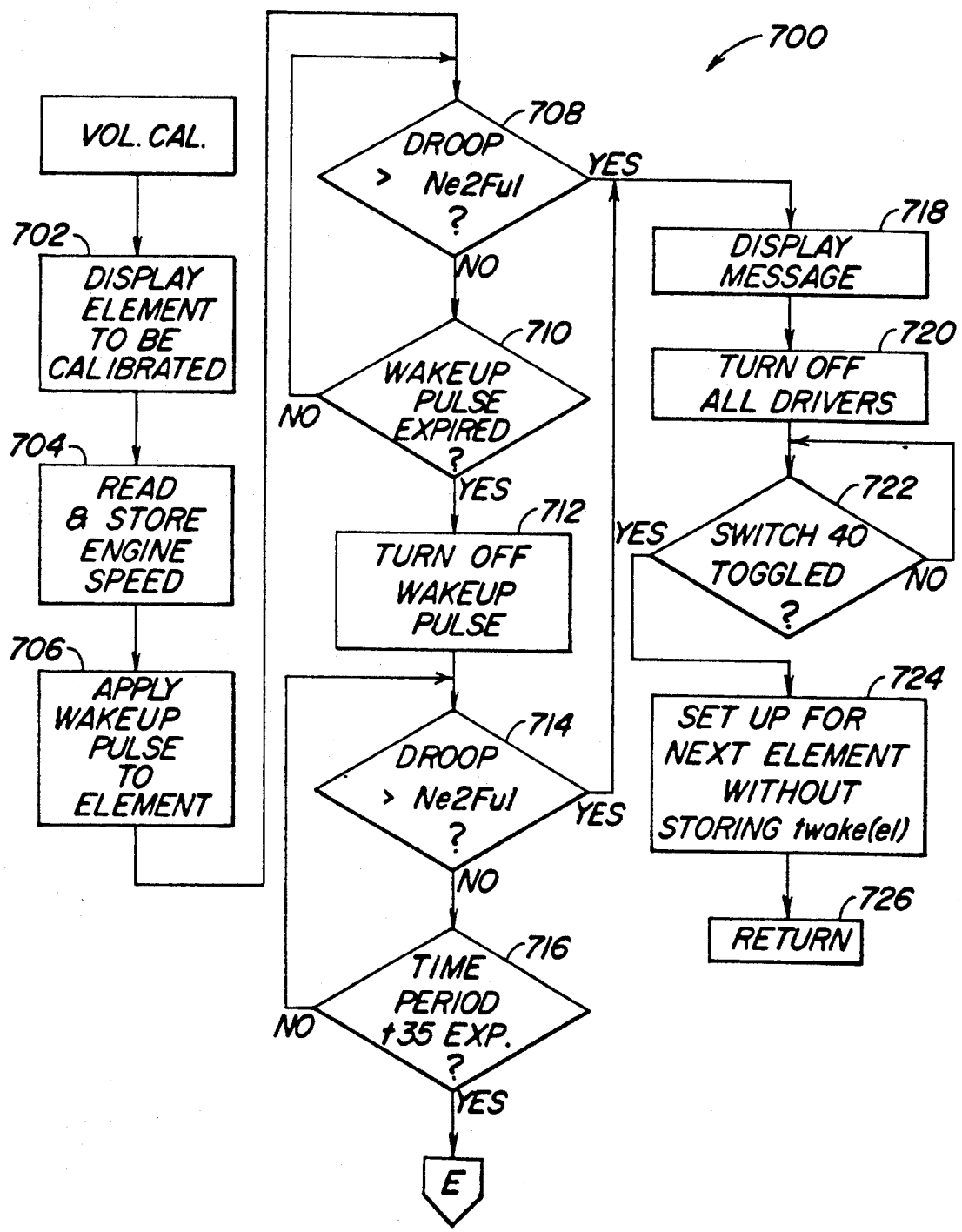
Figure 7B:
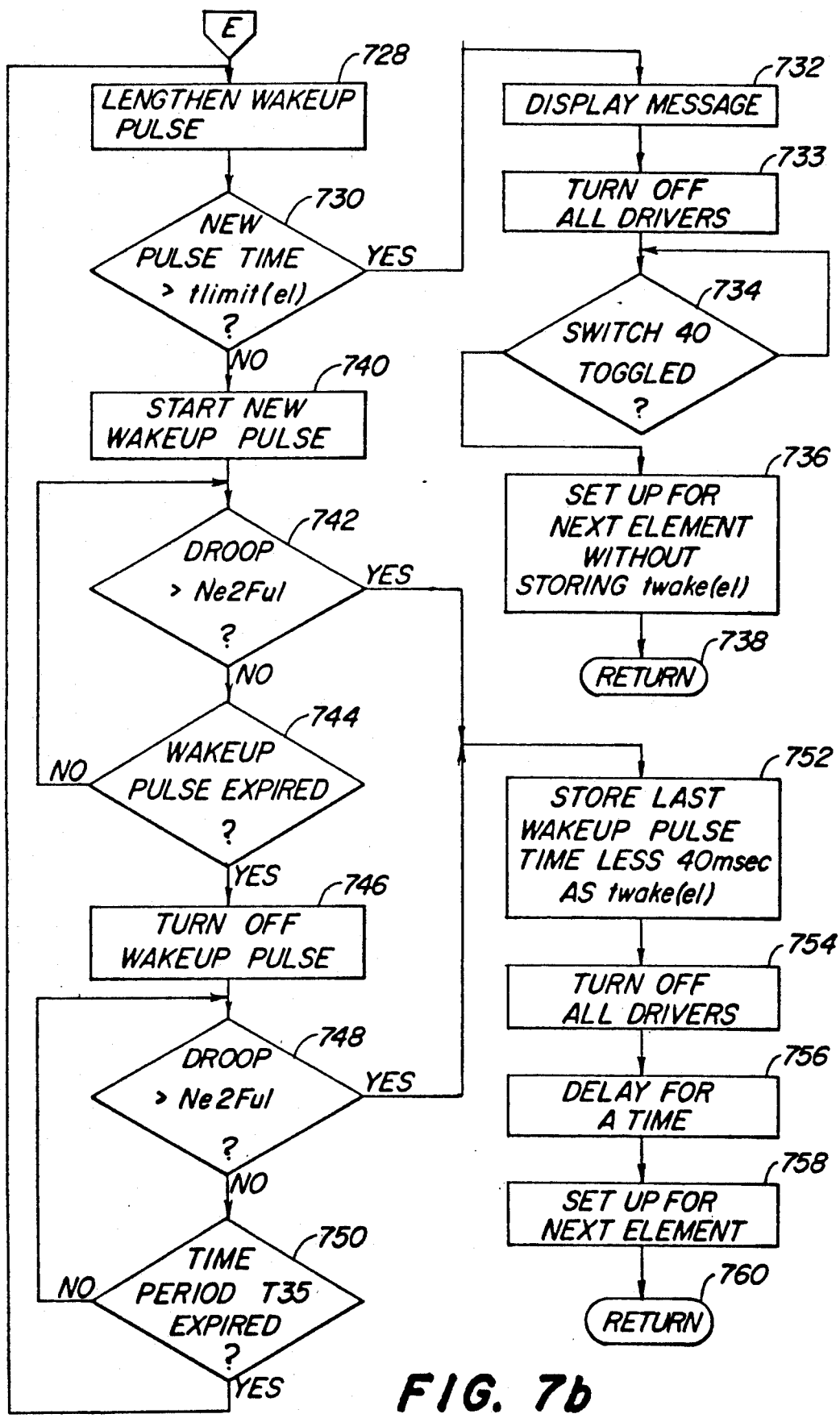

Referring now to FIGS. 7a–7b, step 702 of this subprocedure displays a message or symbol to indicate which element is being calibrated. The procedure begins with element C2 of the Calibration Table. Then, the system proceeds to step 704 where the engine speed from sensor 46 is read and stored. Next, in step 706, for the element being calibrated, a "wakeup" pulse is applied to the element being calibrated. This means that the element will be commanded to full system pressure for an initial time period. This time period is variable, depending upon which element is being calibrated. Steps 708–710 operate to calculate the engine speed droop and compare the droop to a threshold value Ne2Ful during the time the wakeup pulse is applied.

If the wakeup pulse terminates and the droop has not exceeded the threshold NeFull, then control passes to the step 712. If the droop does exceed the threshold, then steps 718–726 operate to display a certain character and turn off or depressurize all elements. Step 722 prevents further operation until switch 40 is toggled (off then on). Then, once switch 40 has detected that the clutch pedal 44 has been depressed and is now released, step 724 causes the controller to leave the current element without storing a volume calibration value twake-(el) and to set up for calibrating the next element.

In step 712 the wakeup pulse is terminated and steps 714–716 operate to calculate the engine speed droop and compare the droop to a threshold value Ne2Ful during a time t35 after the start of the wakeup pulse is applied. If the droop does exceed the threshold, then step 714 directs control to previously described steps 71814 726. If the droop does not exceed the threshold, then at the end of time t35 step 716 directs control to step 728.

Step 728 increases the duration of the wakeup pulse by one time interval. If in step 730 the new duration is greater than tlimit(el) for the corresponding element, then in steps 732 –733 a message is added to the display in the right-most display digit and all elements are turned off. Step 734 prevents further operation until Clutch Engaged switch 40 is toggled, then step 736 causes the controller to leave the current element without storing a fill volume value and set up to calibrate the next element. If in step 730 the new duration does not exceed tlimit(el), then control proceeds to step 740.

Steps 742–744 operate to calculate the engine speed droop and compare the droop to the threshold value Ne2Ful during the new duration of the wakeup pulse. If the droop does exceed the threshold, then the element is considered to be "full" and step 742 directs control to step 752-760. Step 752 stores the last wakeup pulse time twake(el) as the volume calibration value and all drivers are turned off by step 754. Step 756 delays for a time period, step 758 sets up for the next element and step 760 causes a return to the main loop. If the droop does not exceed the threshold, then at the end of the new duration of the wakeup pulse step 744 directs control to step 746 which turns off the wakeup pulse at the end of the new duration.

Then steps 748–750 operate to calculate the engine speed droop and compare the droop to a threshold value Ne2Ful during a time t35 after the start of the new wakeup pulse. If the droop does exceed the threshold, then step 748 directs control to previously described steps 752-760. If the droop does not exceed the threshold, then at the end of time t35 step 750 directs control to back to step 728.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a control system for a vehicle powershift transmission in a power train having an engine for driving the transmission, a disconnect device for connecting and disconnecting an output shaft of the transmission from a vehicle drive shaft and a plurality of hydraulic pressure operated control elements for shifting the transmission, at least one of which is operated by an electrohydraulic proportional control valve, a method of determining a hydraulic parameter associated with the control element controlled by the proportional control valve, comprising the following steps:

disengaging the disconnect device so that the transmission output shaft is free to rotate;

controlling engagement of certain ones of the plurality of the control elements other than the control element being calibrated in order to cause relative rotation between parts of the control element being calibrated;

operating the engine in a predetermined speed range;

modifying a signal applied to the proportional control valve to gradually modify the hydraulic parameter associated with the control element being calibrated while monitoring engine speed; and when the monitored engine speed changes by predetermined amount, saving a value of the signal applied to the proportional control valve as the hydraulic parameter calibration value.

2. The method of claim 1, wherein:
the hydraulic parameter is the pressure required to initially engage the control element controlled by the proportional control valve.

3. The method of claim 1, wherein:
the hydraulic parameter is the volume of hydraulic fluid required to initially engage the control element controlled by the proportional control valve.

4. The method of claim 1, wherein:
the hydraulic parameter is the time required to fill with pressurized hydraulic fluid and initially engage the control element controlled by the proportional control valve.

5. The method of claim 1, further comprising:
automatically shifting the transmission to neutral if vehicle motion is sensed.

6. In a control system for a vehicle powershift transmission in a power train having an engine for driving the transmission, a disconnect device for connecting and disconnecting an output shaft of the transmission from a drive shaft and a plurality of hydraulic pressure operated control elements for shifting the transmission, at least one of which is operated by an electrohydraulic proportional control valve, a method of determining the pressure required to initially engage the control element controlled by the proportional control valve, comprising the following steps:
controlling engagement of certain ones of the plurality of the control elements other than the control element being calibrated in order to cause relative rotation between parts of the control element being calibrated;
operating the engine at a predetermined speed range;
modifying a signal applied to the proportional control valve to gradually increase the pressure applied to the control element being calibrated while monitoring engine speed;
when the monitored engine speed droops by predetermined amount, saving a value of the signal applied to the proportional control valve as the element calibration pressure; and
automatically shifting the transmission to neutral if vehicle motion is sensed.

7. The method of claim 6, further comprising:
automatically repeating all the above steps for each of the plurality of control elements.

8. The method of claim 6, further comprising:
initially applying a low starting pressure (Pstrt(el)) to the element being calibrated; and
gradually increasing the pressure applied to the control element being calibrated.

9. In a control system for a vehicle powershift transmission in a power train having an engine for driving the transmission, a disconnect device for connecting and disconnecting an output shaft of the transmission from a drive shaft and a plurality of hydraulic pressure operated control elements for shifting the transmission, at least one of which is operated by an electrohydraulic proportional control valve, a method of determining the pressure required to initially engage the control element controlled by the proportional control valve, comprising the following steps:
disengaging the disconnect device so that the transmission output shaft is free to rotate;
operating the engine in a predetermined speed range;
modifying a signal applied to the proportional control valve to gradually increase the pressure applied to the control element being calibrated while monitoring engine speed; and
when the monitored engine speed droops by predetermined amount, saving a value of the signal applied to the proportional control valve as the element calibration pressure.

10. The method of claim 9, further comprising:
automatically shifting the transmission to neutral if vehicle motion is sensed.

11. The method of claim 9, further comprising:
controlling engagement of certain ones of the plurality of the control elements other than the control element being calibrated in order to cause relative rotation between parts of the control being calibrated.

12. In a control system for a vehicle powershift transmission in a power train having an engine for driving the transmission, a disconnect device for connecting and disconnecting an output shaft of the transmission from a drive shaft and a plurality of hydraulic pressure operated control elements for shifting the transmission, at least one of which is operated by an electrohydraulic proportional control valve, a method of determining the time required to initially engage the control element controlled by the proportional control valve, comprising the following steps:
disengaging the disconnect device so that the transmission output shaft is free to rotate;
operating the engine in a predetermined speed range;
sensing and storing an initial engine speed;
applying a predetermined pressure to the control element to be calibrated for a predetermined time period;
sensing the current engine speed;
increasing the predetermined time period by an increment and repeating the applying and sensing steps until the sensed engine speed droops by a predetermined amount when compared to the initial engine speed; and
when the sensed engine speed has drooped by a predetermined amount indicating that the control element is being loaded, storing a time value.

* * * * *